(12) United States Patent
Ferreira et al.

(10) Patent No.: US 7,097,939 B2
(45) Date of Patent: Aug. 29, 2006

(54) GEL-FORMING BATTERY SEPARATOR

(75) Inventors: Anthony L. Ferreira, Nashua, NH (US); Norman Lifshutz, Nashua, NH (US); Wai Ming Choi, West Newton, MA (US)

(73) Assignee: Hollingsworth & Vose Company, East Walpole, MA (US)

( * ) Notice: Subject to any disclaimer, the term of this patent is extended or adjusted under 35 U.S.C. 154(b) by 316 days.

(21) Appl. No.: 10/069,817

(22) PCT Filed: Jul. 13, 2001

(86) PCT No.: PCT/US01/22090

§ 371 (c)(1),
(2), (4) Date: Jun. 5, 2002

(87) PCT Pub. No.: WO02/07237

PCT Pub. Date: Jan. 24, 2002

(65) Prior Publication Data

US 2002/0192562 A1    Dec. 19, 2002

(51) Int. Cl.
*H01M 2/16* (2006.01)
*H01M 6/04* (2006.01)
*H01M 61/14* (2006.01)

(52) U.S. Cl. ............... 429/302; 429/134; 429/188; 429/300

(58) Field of Classification Search ............... 429/204, 429/252, 300, 302
See application file for complete search history.

(56) References Cited

U.S. PATENT DOCUMENTS

| | | | |
|---|---|---|---|
| 1,383,190 A | 6/1921 | Demas | |
| 3,172,782 A * | 3/1965 | Jache | 429/147 |
| 3,351,495 A | 11/1967 | Larsen et al. | |
| 3,985,580 A | 10/1976 | Cogliano | |
| 4,150,199 A | 4/1979 | Tuphorn et al. | |
| 4,317,872 A | 3/1982 | Varma | |
| 4,359,511 A | 11/1982 | Strzempko | |
| 4,363,856 A * | 12/1982 | Waterhouse | 429/143 |
| 4,414,295 A | 11/1983 | Uba | |
| 4,937,156 A | 6/1990 | Boeller et al. | |
| 5,091,275 A | 2/1992 | Brecht et al. | |
| 5,180,647 A * | 1/1993 | Rowland et al. | 429/252 |
| 5,230,949 A | 7/1993 | Howard et al. | |

(Continued)

FOREIGN PATENT DOCUMENTS

EP    0 680 105 A1    11/1995

(Continued)

OTHER PUBLICATIONS

Degussa Fumed Silica Brochure [online]. Retrieved on Aug. 27, 2004 from the Internet: <https://www1.sivento.com/wps3/portal/action/PassContent/.reqid/-1?cqpath=http://x:x@www2.sivento.de/uploads_all/text/General_Aerosil_brochure_GB.(smaller_file)_.pdf>.*

(Continued)

*Primary Examiner*—Dah-Wei Yuan
*Assistant Examiner*—Helen Chu
(74) *Attorney, Agent, or Firm*—Nutter, McClennen & Fish LLP

(57) ABSTRACT

Gel-forming battery separators and methods for constructing them. Particles are embedded into pores of a porous support to form a composite. The chemical make-up of surfaces of the particles includes a silanol group. The composite, when contacted with an effective amount of liquid electrolyte, is capable of forming a gelled matrix that includes electrolyte residing within the porous support. Batteries and methods of forming batteries featuring gel-forming separators are also disclosed. No pre-mixing of siliceous material with electrolyte is required facilitating battery construction.

5 Claims, 2 Drawing Sheets

U.S. PATENT DOCUMENTS

| | | | |
|---|---|---|---|
| 5,336,275 | A | 8/1994 | Zguris et al. |
| 5,362,582 | A | 11/1994 | Chang et al. |
| 5,478,677 | A | 12/1995 | Choi et al. |
| 5,514,494 | A | 5/1996 | Stempin et al. |
| 5,605,549 | A | 2/1997 | Zucker |
| 5,728,331 | A | 3/1998 | Stempin et al. |
| 5,800,948 | A | 9/1998 | Moseley |
| 5,989,750 | A | 11/1999 | Ohba et al. |
| 6,071,641 | A | 6/2000 | Zguris |
| 6,120,939 | A | 9/2000 | Whear et al. |
| 6,124,059 | A * | 9/2000 | Bohnstedt et al. ......... 429/252 |
| 6,174,826 | B1 | 1/2001 | Williams et al. |
| 6,306,539 | B1 * | 10/2001 | Zguris ....................... 429/144 |

FOREIGN PATENT DOCUMENTS

| | | |
|---|---|---|
| EP | 0 680 105 B1 | 11/1995 |
| JP | 10-255752 | 9/1998 |
| WO | WO 99/67831 | * 12/1999 |

OTHER PUBLICATIONS

Bohnstedt, W. "New Development in Separators for Valve-Regulated Lead-Acid Batteries," *Journal of Power Sources*, vol. 78, pp. 35-40 (1999), no month.

Ferreira, A. L., Lingscheidt, H. A. "Impact of Separator Design on the Performance of Gelled-Electrolyte Vavle-Regulated Lead/Acid Batteries," *Journal of Power Sources*, vol. 67, pp. 291-297 (1997), no month.

Finson, E., Kaplan, S. L. "Surface Treatment", *Wiley Encyclopedia of Packaging Technology*, Second Edition, John Wiley & Sons, (1997).

Kaplan, S. L., Hansen, W. P. "Gas Plasma Treatment of Kevlar and Spectra Fabrics for Advanced Composites," *SAMPE International Conference*, Orlando, FL. (Oct. 29, 1997).

Kaplan, S. L. "Cold Gas Plasma Treatment for Re-engineering Films," *Paper Film Foil Converter*, vol. 71, No. 6, (Jun. 1997).

Coates, D. M., Kaplan, S. L. "Modification of Polymeric Material Surfaces with Plasmas," *Plasma Processing of Advanced Materials, MRS Bulletin*, (Aug. 1996).

Shiomi, M., Takahashi, K., Tsubota, M. "Valve-Regulated Lead/Acid Batteries with Granular Silica," *Journal of Power Sources*, vol. 42, pp. 73-184 (1993), no month.

May, G. J. "Meeting European Requirements with Advanced Designs of Valve-Regulated Lead/Acid Batteries," *Journal of Power Sources*, vol. 42, pp. 147-153 (1993), no month.

Bearinger, I. C. "History of Valve Regulated Lead Acid Batteries in the United States," *The Battery Man.*, V.P.—Engineering, Yuasa-Exide, Inc., pp. 28-35 (Dec. 1992).

Berndt, D., Meissner, E., Rusch, W. "Aging Effects in Valve-Regulated Lead-Acid Batteries," S.22.B *Batteries AU Plomb Etanche*, pp. 139-145, no month.

Hlavac, M. J., Feder. D. O., Ogden, D. "Field Application of Conductance Measurements Used to Ascertain Cell/Battery and Inter-Cell Connection State-of-Health in Electric Power Utility Applications," *Proceedings of the American Power Conference*, pp. 45-57, no month.

* cited by examiner

GEL-FORMING BATTERY SEPARATOR

BACKGROUND OF THE INVENTION

Valve regulated ("sealed") lead acid (VRLA) batteries are known. These batteries include a plurality of positive and negative plate electrodes, as in a prismatic cell, or include layers of separator and electrode tightly wound together, known as "jelly roll" cells. The electrodes within a battery are arranged so that they alternate, negative-positive-negative, etc., with separator material between adjacent plates.

The separator, typically composed of a mat of fiberglass, serves several purposes. These include to retain electrolyte and to electrically insulate one electrode from the other. In addition, the partial saturation of the separator allows for void spaces through which gaseous oxygen may be transferred from a positive electrode, where it is generated, to a negative one, where it is consumed and reincorporated into the electrolyte. This is generally referred to as the internal oxygen cycle.

In order to establish an efficient oxygen cycle, the electrolyte should be immobilized. There are two known techniques to achieve this goal. One consists of absorbing the electrolyte within a fine fiber absorbent separator; the other is solidifying/gelling it by reaction with fine particles of, typically, fumed or colloidal silica. In this latter technique, the battery requires microporous separators to keep opposing electrodes apart. Various aspects regarding the process of gelling the electrolyte cause practical difficulties.

Some of the difficulties arise because sulfuric acid electrolyte reacts with fine silica particles quite readily. To prevent premature gel formation prior to filling the battery with a mixture of electrolyte and silica particles, the mixture may either be stirred, or chilled to about 15 degrees Celsius below the ambient temperature. Further, the amount of fine silica particles needed to gel sulfuric acid depends on the acid concentration. Thus, if a dilute sulfuric acid solution is desirable, a much larger amount of silica particles will be necessary to initiate gelation. An aqueous solution of sulfuric acid, having a specific gravity of 1.280 will require 6% of its weight in fumed silica particles to form a gel. A weaker solution, having a specific gravity of about 1.050, will require about three times as much silica to form a gel.

Two processes are currently available to the battery manufacturer to produce batteries with gelled electrolyte. One process entails assemblage of a battery with its plates already electrochemically charged, followed by filling the battery with an electrolyte having a specific gravity in the range of 1.240–1.260. Approximately 6%–9% of fine silica particles are then added to the electrolyte. To prevent gel formation, the mixture must be kept continuously stirred and/or chilled 15–20 degrees Celsius below the ambient temperature. Once filled, the batteries are recharged and the electrolyte specific gravity rises to a range between 1.270 and 1.300. The second process includes the assembly of a battery with electrochemically uncharged plates. The plates are then treated with an electrolytic solution with specific gravity in the range of 1.200–1.240 to "form" the battery. Following formation, the battery is completely discharged. In this state, the sulfate content of the plates is known to be quite high. The electrolytic solution used during formation is then removed and the battery is refilled with a mix of sulfuric acid solution, with specific gravity in the range of 1.050–1.100, and 12%–18% (by weight) of fine silica particles. The battery is then recharged. Upon completion of recharging, the electrolyte/silica will be gelled. The electrolyte specific gravity will have reached a level of 1.280–1.300.

A need exists for a battery separator which overcomes these drawbacks to current technology.

SUMMARY OF THE INVENTION

The invention provides, in accordance with a first embodiment, a method for constructing a gel-forming battery separator. Particles are embedded into pores of a porous support to form a composite. The chemical make-up of surfaces of the particles includes a silanol group. The composite is contacted with an effective amount of liquid electrolyte. Such contact of the composite with the electrolyte is capable of forming a gelled matrix that includes electrolyte residing within the porous support. The particles may be fumed silica particles; the electrolyte may be sulfuric acid. The effective amount of sulfuric acid may be determined such that the fumed silica particles, by weight, constitute in the range of about six percent to ten percent of the weight of the sulfuric acid. Embedding may involve placing particles adjacent the porous support and applying a mechanical force to the porous support. This force may be applied by calendering. Alternatively, particles may be embedded by electrostatically precipitating the particles upon the porous support.

Embedding may instead involve applying the particles to a side of the porous support and applying a vacuum to an opposite side of the porous support. Gel-forming battery separators constructed by the above-described methods represent additional embodiments of the present invention.

In accordance with another embodiment, a battery including a container, a plurality of alternating positive and negative electrodes disposed within the container; and gel-forming separators disposed between the plurality of positive and negative electrodes is provided. Each gel-forming separator has a porous support and particles embedded within the porous support. The particles have surfaces comprising a silanol group. These particles are capable of forming a gelled matrix comprising electrolyte within the porous support.

In a further embodiment, a method of forming a battery is provided. Gel-forming battery separators are placed between pairs of electrodes residing in a container, each separator having a porous support; and embedded particles within pores of the support. The particles have surfaces chemically comprising a silanol group. Liquid electrolyte is added to the container, the liquid electrolyte having a specific gravity below a predetermined value required to form a gelled matrix when in contact with the separators. The electrodes are then charged to form the battery. Charging causing an increase in the specific gravity to the value required to form the gelled matrix. If the particles are fumed silica and the liquid electrolyte is sulfuric acid, the value required to form the gelled matrix is about 1.28.

Gel-forming battery separators having a porous support and embedded particles having surfaces chemically comprising a silanol group are provided in additional embodiments. The porous support may be a woven or a nonwoven fabric. The nonwoven fabric may be polypropylene or polyester. Alternatively, the porous support may be a glass fiber support, more specifically, with borosilicate fiber. The porous support may have pores measuring in the range of about 10 microns to 100 microns. The particles may be silica, finned silica, mica, silicate, polysilicate, or alumina silica. More specifically, fumed silica particles may have a size in the range of about 5 nm to 25 nm. Particles may have a surface area in the range of about 175 $m^2/g$ to 225 $m^2/g$ and may have a density of about 30 g/l.

DETAILED DESCRIPTION OF THE INVENTION

Figure 1:
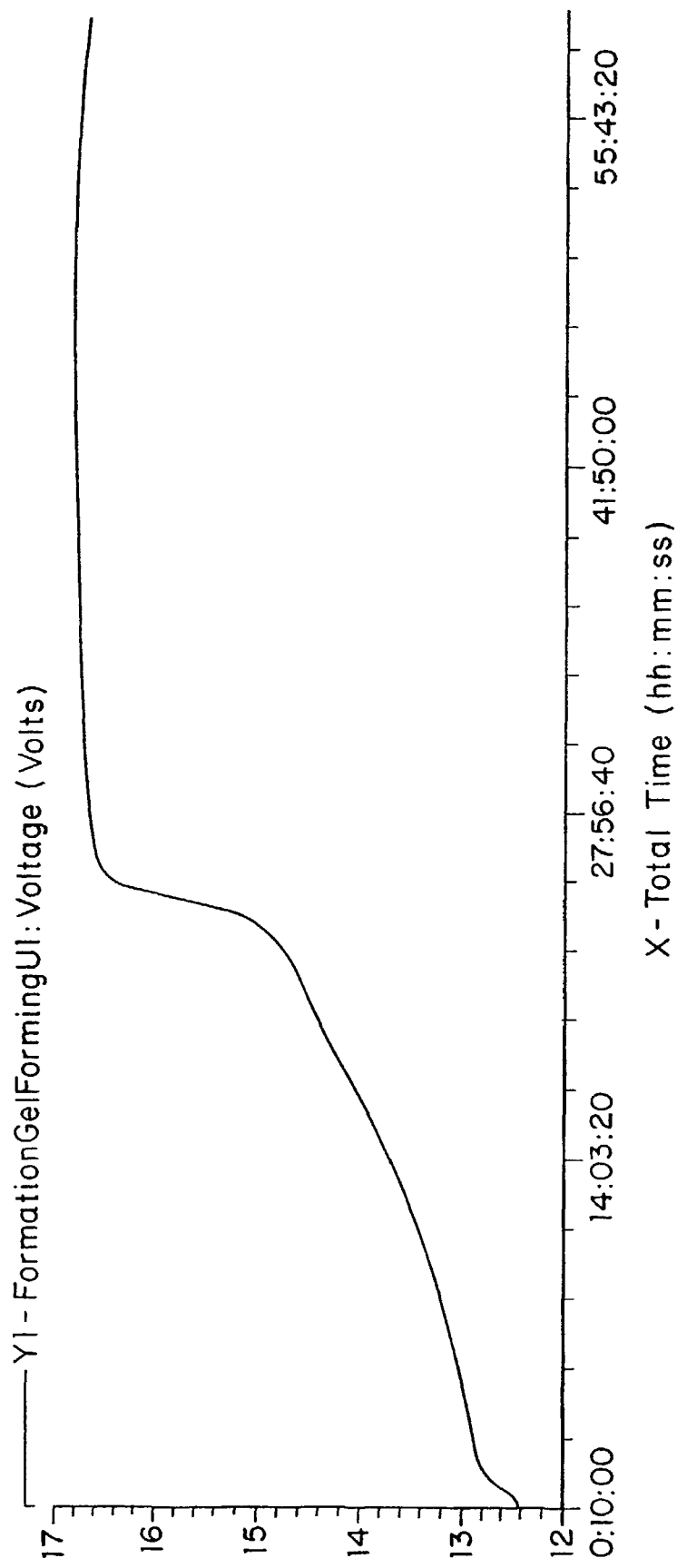
FIG. 1 depicts a graphical representation of the formation of a battery of in accordance with an embodiment of the invention.

The following definitions are included to help clarify the detailed description.

The term "battery separator" or "separator" are terms recognized in the art and are intended to mean devices located between positive electrodes and negative electrodes to act as physical and electrical barriers to prevent short-circuiting therebetween. Further VRLA battery separators hold an electrolyte thereon to enable a desired electromotive reaction.

The terms "porous" and "microporous" are recognized in the art and are intended to describe materials that have a plurality of interconnected interstices. These interconnected interstices admit passage of gas or liquid and, more generally provide communication both within and external to a structure made from the material.

A porous support is part of a gel-forming battery separator in accordance with embodiments. The support may be made of a woven fabric or from a nonwoven material. The term "woven fabric" is art recognized and refers to the weaving of fibers (e.g., polymer resin fibers) into a fabric by conventional weaving techniques. The term "nonwoven" is art recognized and is intended to include those fibrous materials which are generally melt blown or spun bonded (e.g., extruded onto a moving web on a conveyer belt.) Alternatively, nonwoven materials may be prepared by what is known in the art as a "wet laid" process, whereby a flocculated mixture of fibers is passed through a screen/sieve with the removal of water. Additionally, non woven materials can be prepared by a "dry laid" process such as carding. Any such non woven supports may additionally be bonded by thermal, chemical or mechanical (needling or hydroentangling) means for improved stiffness.

The phrase "particles having a surface silanol group" includes those compositions that have silanol groups present on the surface of the particles. Suitable examples include variants of polymeric resins and siliceous materials that can hydrogen bond to water, such as variants of silica, mica, montmorilonite, asbestos, talc, diatomaceous earth, vermiculite, synthetic and natural zeolites, Portland cement, silicates, polysilicates, alumina silica and glass particles.

The phrase "an effective amount" is intended to mean that amount of liquid electrolyte (such as sulfuric acid) necessary to be in contact with particles having a surface silanol group, required to create a gel entrapping/immobilizing electrolyte(s) within the separator. This amount will vary depending upon the chemistry of the particles and the specific gravity of acid; a skilled artisan can determine what ratio of percentage of particles to acid is required to cause gelation to occur.

Not to be in any way limited to a particular theory or to disclosed examples, it is believed that the surface silanol groups react, under sufficiently acidic conditions to form a crosslinked, perhaps siloxane-based polymeric network that tends to immobilize or trap electrolyte. Such a network also provides channels to facilitate ion migration that leads to electric flow.

In one embodiment, a gel-forming composite battery separator includes a porous support with particles having surface silanol groups (e.g. fumed silica particles) embedded within the pores of the support.

The porous support must be able to withstand a harsh chemical environment created by the presence of liquid electrolytes such as sulfuric acid. Typically, the porous support is a nonwoven material; however it could also be a woven fabric. In specific embodiments for which the porous support is nonwoven, the fiber diameter may range from about 5 microns to 30 microns, more specifically between about 20 to 25 microns. In general, the fiber diameter of a fabric-based porous support is at least about 500 times larger than the diameter of the particles enmeshed throughout the porous structure of the support material. In other embodiments, the porous support might be an open cell polymer foam having a pore size from about 1 to 300 microns, more specifically between about 50 to 100 microns. In general, the interstices of the support wall comprise a void volume of at least about twenty percent of the support. The greater the void volume is, the better. Generally, a support should have as much as about ninety-seven percent void volume.

Suitable polymeric materials for porous supports include but are in no way limited to, polyolefins such as polyethylene, polypropylene, polyisobutylene, and ethylene-alpha-olefin copolymers; acrylic polymers and copolymers such as polyacrylate, polymethylmethacrylate, polyethylacrylate; polyvinyl ethers such as polyvinyl methyl ether; polyacrylonitrile; polyvinyl ketones; polyvinyl aromatics such as polystyrene; polyvinyl esters, such as polyvinyl acetate; copolymers of vinyl monomers with each other and olefins, such as ethylene-methyl methacrylate copolymers, acrylonitrile-styrene copolymers, ABS resins, and ethylene-vinyl acetate copolymers; natural and synthetic rubbers, including butadiene-styrene copolymers, polyisoprene, synthetic polyisoprene, polybutadiene, butadiene-acrylonitrile copolymers, polychloroprene rubbers, polyisobutylene rubber, ethylene-propylene rubber, ethylene-propylene-diene rubbers, isobutylene-isoprene copolymers, and polyurethane rubbers;

polyesters, such as polyethylene terephthalate; polycarbonates; polyimides; and polyethers.

Alternatively, the porous support may be formed from a chemically resistant glass fiber composition, such as a borosilicate glass fiber mat or C-glass. The term "C-glass" (chemical glass) is recognized in the art and is intended to include those glass fibers resistant to corrosion by acid and moisture. Such glass fiber compositions often contain zinc oxide as well as other oxides which make the fibers more resistant to chemical destruction. Typical commercially available C-glass fibers have compositions which include from about 65 to about 75% $SiO_2$, from about 2 to about 6% $Al_2O_3$, from about 4 to about 14% CaO, from about 0 to about 5% MgO, from about 2 to about 7% $B_2O_3$, from about 9 to about 13% $Na_2O/K_2O$, from about 1 to about 6% ZnO, and from about 0% to trace amounts of $FeO/Fe_2O_3$. The porous support may also be a combination of glass fibers and polymeric fibers.

The porous support provides strength and stiffness to the composite separator. The support may also be foldable.

In general, the porous support has a weight basis in the range of about 30 $g/m^2$ to 200 $g/m^2$, more specifically about 100 $g/m^2$.

Typically, the thickness of the porous support is in the range of 1 to 10 mm, more specifically in the range of about 2 to 3 mm prior to, if desired, compression of the ultimate separator. If the composite separator is to be compressed, its final thickness will be in the range of about 1.5 to 2 mm.

Particles with surfaces having a silanol group are embedded/enmeshed within the porous structure of the porous support. That is, the particles are trapped within high loft porous support materials, such that the particles are uniformly dispersed throughout the open celled structure of the porous support. It has been found that very fine particles embedded within the interstices of the support provide the most advantageous battery separators, although larger sized particles are not outside the scope of the present invention. For example, suitable ranges for particles, are in the range of about 5 nm to 25 nm. Suitable particles have a surface area in the range of about 175 $m^2/g$ to 225 $m^2/g$, and preferably about 200 $m^2/g$. Additionally, the particles generally can have a density of about 30 g/l.

In certain aspects of the invention, the ratio of the weight of particulates to the weight basis of the support is at least 50%. In general, it is desirable to maximize this ratio.

In an exemplary embodiment, the siliceous material is silica. Silica can take on many forms; however, fumed silica is used in the present invention as the particulate because of its active silanol groups. Suitable fumed silicas include those available from Cabot Corporation and referred to as CAB-O-SIL, untreated fumed silica (CAS No. 112945-52-5, Cabot Corporation, Cab-O-Sil Division, 700 E. U.S. Highway 36, Tuscola, Ill.) or Degussa-Huls Corporation referred to as Aerosil (Aerosil 200, BET surface 193 $m^2/g$, Degussa-Huls Corporation, Waterford, N.Y.).

As described above, it is believed that silanol groups on different particles react under acidic conditions to form a cross-linked network. The siloxane cross-linkage is a compound of silicon and oxygen in which each atom of silicon is bonded to four oxygen atoms, forming a tetrahedral structure, in a manner analogous to the bonding of carbon to hydrogen in methane, the bonds being of about the same strength in each case. This structure is found in the dioxide and in silicates generally, where the SiO4 groups occur in chains or rings. By creating siloxane cross-linkages, a gel is formed entrapping the electrolyte(s) within the gel.

In exemplary embodiments, the silica component constitutes less than about 30% of the electrolyte's (in this case, sulfuric acid) weight. The particles with surface silanol groups, may constitute a range of at least 6% to about 10% of the electrolyte's weight, and most specifically about a 6% ratio to sulfuric acid at a specific gravity of about 1.280. Increasing the specific gravity of the sulfuric acid will cause gelation, however, a specific gravity of below about 1.26 will not cause gelation.

Suitable methods to embed the particles, within the pores of the material include mechanical force, such as a direct application of pressure to a layer of particles disposed on or adjacent to the support. Alternatively, the particles may be blown into the support and trapped. The resultant composite can be calendered, thereby compressing the porous support about the entrapped particles. Still another method to entrap the particles is by electrostatic precipitation. This process is based on the technology developed and patented by Electrostatic Technology, Inc. (Electrostatic Technology, Inc., 4 Pin Oak Drive, Branford, Conn.) where particulate material is applied to a porous substrate. The particles are aerated in a fluidizing chamber and are electrostatically charged by ionized air. As the particles become charged, they repel each other and rise above the fluidizing bed. The porous support is passed through the cloud of charged particles. The charged particles are attracted to the support and become embedded within the porous structure. In still another method, particles are applied to one side of the porous support and a vacuum is applied to the opposite side of the porous support. The particles are then distributed throughout the porous structure of the porous support by the suctioning of the particles through the matrix of open pore cells throughout the porous support.

A way is thus provided, in accordance with an exemplary embodiment, to suspend the dry particles in a three dimensional environment prior to treatment with sulfuric acid, or another liquid electrolyte. Addition of an effective amount of sulfuric acid to the particles embedded within the porous support causes a gelling reaction. It has been determined that a reaction occurs when famed silica is exposed to sulfuric acid having at least 1.28 specific gravity. The sulfuric acid electrolyte is then incorporated within the formed gelatinous matrix. When this is performed within a battery, the porous support and particles therein, envelop the anode and cathode. This provides a substantially homogenous environment for the transfer of electrochemical energy via ions, e.g., the electrolyte which includes sulfuric acid, sulfate ion, water, hydronium ion, hydroxide ion, etc.

Specific gravity of the sulfuric acid electrolyte is known to increase as a lead-acid battery is charged. Sulfate ions from the battery electrodes are released, causing the increase. At about a specific gravity of 1.28, the fumed silica particles and the electrolyte form a gelled matrix within the porous support. Alternatively, the particles may be exposed to sulfuric acid having a specific gravity above about 1.29 which results in gelation without the requirement of first charging of the battery.

Thus, in accordance with a particular embodiment directed toward battery formation, electrodes and separators may be installed into a battery container and introduced to sulfuric acid at a specific gravity of less than 1.28. Upon subsequent charging, fumed silica particles merely adsorb/absorb the electrolytic solution. Ultimately, at a specific gravity of about 1.28, the acidic solution causes the particles to gel, thereby causing the electrolyte(s) to become enmeshed within the gel and forming the composite about electrodes where it was placed. After the composite has gelled and formed about the electrodes, the resultant battery has a uniform distribution of gelled electrolyte material about and between the electrodes. Uniform incorporation of the particles prior to acid treatment, therefore affords a uniform gelled electrolyte within the porous network of the support upon acid treatment.

Oxygen transport in a lead-acid battery also takes place in the form of diffusion of the gaseous phase of oxygen through open channels between the electrodes. The electrolytic porous composite gel provides fissures or channels through which gaseous oxygen can move between electrodes. The channels are formed in the gelled electrolyte(s) as a result of a small amount of drying and cracking of the gel as water is lost during initial operation of the battery. However, since the gel is uniform throughout the porous support, stratification of the electrolyte is minimized or prevented.

It is noteworthy that the sulfuric acid component in the electrolytic solution has a concentration in the range of about 30 to 50% of the total volume of the solution. This figure is calculated using sulfuric acid which has a specific gravity of about 1.400 before mixing. More specifically, the sulfuric acid concentration may be in the range of about 43 to 48% of the total volume of the solution. An alternative method of measuring an appropriate amount of sulfuric acid in the electrolyte is to measure the specific gravity after mixing the sulfuric acid into the electrolyte. By this method, the sulfuric acid component should have a specific gravity in the range of about 1.200 to 1.390, and, more specifically, in the range of about 1.28 to 1.29.

The following example serves to illustrate a specific embodiment.

EXAMPLE

A battery was prepared with 3 positive and 4 negative plates. The battery separator of the invention was prepared by taking 24 cm by 13 cm sheets having a weight basis range of about 3.04 to 3.76 g of polyester nonwoven (Hollingsworth & Vose 7333, a polyester nonwoven having a weight basis of 95 g/m$^2$, thickness of 2.3 mm, and Frazier permeability of 279 ces; available from Hollingsworth & Vose Company, East Walpole, Mass.) and embedding into the nonwoven in the range of about 1.86 to 2.62 g of fumed silica (See Tables 1 and 2) by mechanically pounding the silica into the nonwoven. The amount of silica used was approximately 6% of the electrolyte weight when a specific gravity of 1.28 was achieved.

TABLE 1

Weights of HOVO-SOL* separators used in the prototype U1 battery.

| Separator No. | Weight of Non Woven (7333) | Weight of added Fumed Silica | Total Separator Weight |
|---|---|---|---|
| 1 | 3.45 g | 2.05 g | 5.50 g |
| 2 | 3.51 g | 2.34 g | 5.85 g |
| 3 | 3.49 g | 2.32 g | 5.81 g |
| 4 | 3.54 g | 2.36 g | 5.90 g |
| 5 | 3.37 g | 2.34 g | 5.61 g |
| 6 | 3.44 g | 2.29 g | 5.73 g |
| 7 | 3.52 g | 1.96 g | 5.48 g |
| 8 | 3.24 g | 2.65 g | 5.89 g |
| 9 | 3.47 g | 2.37 g | 5.84 g |
| 10 | 3.32 g | 2.73 g | 6.05 g |
| 11 | 3.44 g | 2.33 g | 5.77 g |
| 12 | 3.27 g | 2.33 g | 5.60 g |
| 13 | 3.54 g | 2.74 g | 6.01 g |
| 14 | 3.44 g | 2.30 g | 5.74 g |
| 15 | 3.76 g | 1.86 g | 5.62 g |
| 16 | 3.33 g | 2.49 g | 5.82 g |
| 17 | 3.59 g | 2.30 g | 5.86 g |
| 18 | 3.04 g | 2.62 g | 5.66 g |
| AVERAGE | 3.43 g | 2.35 g | 5.78 g |

*HOVO-SOL denotes the gelled electrolyte battery separator(s)

TABLE 2

Weights of active materials of prototype U1battery

| | |
|---|---|
| Weight of Positive Active Material | 931 g |
| PAM/Cell | 155 g/cell |
| Weight of Negative Active Material | 2143 g |
| NAM/Cell | 357 g/cell |
| Weight of dry unformed battery | 8.460 Kg |
| Weight of wet battery BEFORE formation (after filling with 1.240 sg acid) | 10.400 Kg (1.94 Kg of acid added or 0.32 Kg/cell) |
| Weight of battery AFTER formation | 10.055 Kg (0.345 Kg of water loss) |
| Final battery weight after topping off | 10.405 Kg |
| Amount of electrolyte per cell | 0.324 Kg |

Formation of the battery was achieved by adding sulfuric acid to the battery and passing electric current through the cells for a period of about 60 hours. The final specific gravity of the fully formed battery was 1.28 to 1.29. The battery was sealed and included one-way valves to allow for internal oxygen recycling. During formation, the specific gravity was raised from an initial reading of 1.24 to 1.28 to 1.29. The voltage profile of the battery is shown in FIG. 1.

Figure 2:
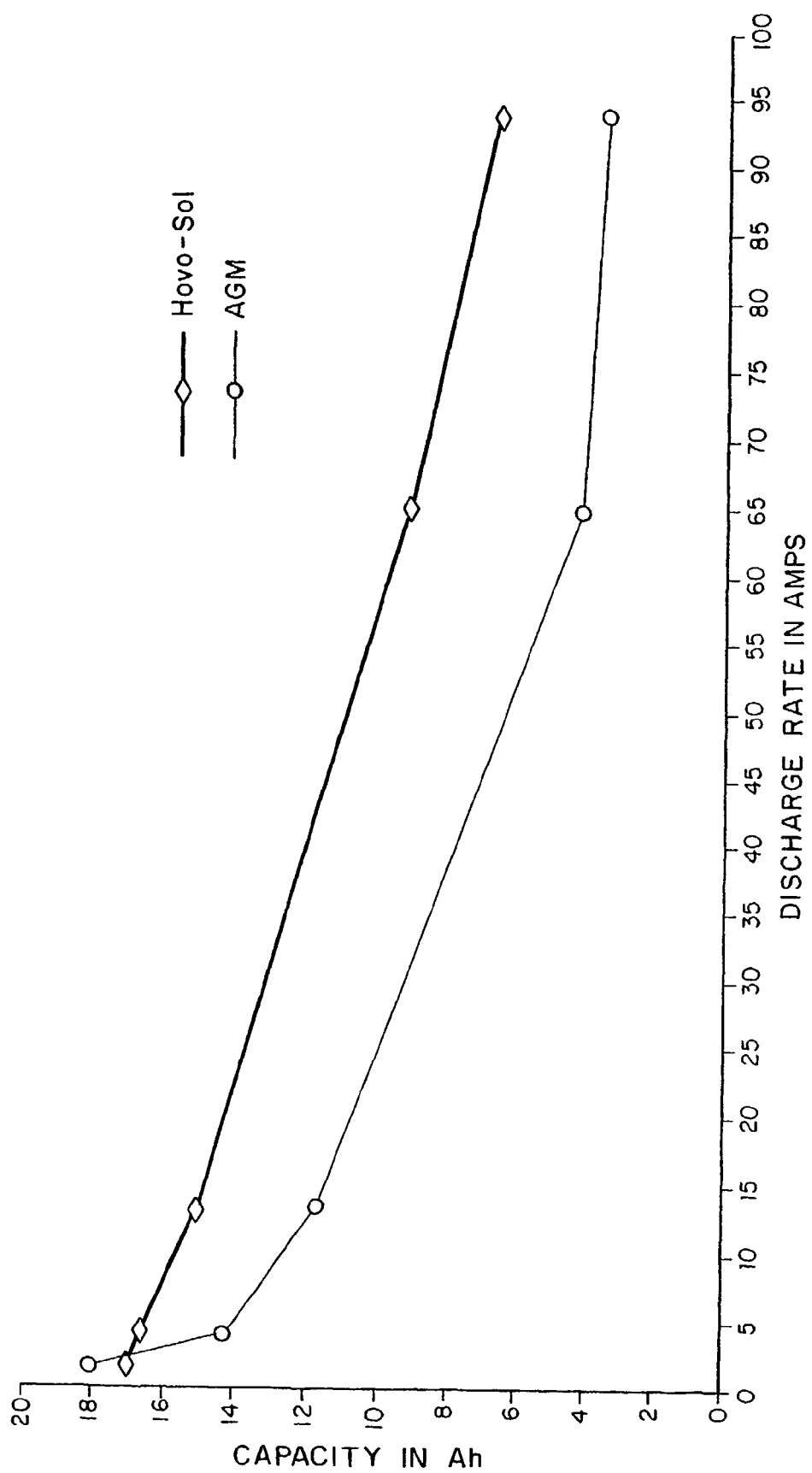
FIG. 2 is a graphical representation comparing discharge rates of a battery, in accordance with an embodiment of the invention with a conventional glass mat formed battery.

Following formation, the battery was submitted to various discharges at different rates to evaluate electrical output. In comparison, results from batteries constructed with absorbent glass mat separators are presented with the present invention in Table 3 and graphed in FIG. 2.

TABLE 3

Initial Electrical Performance results of Prototype and best results of similar AGM batteries

| Rate | Hovo-Sol Ah removed | Hovo-Sol Ah/kg PAM Grams PAM/Ah | AGM Ah removed | AGM Ah/kg PAM Grams PAM/Ah |
|---|---|---|---|---|
| 94 A (5 min) | 6.6 Ah | 42.5 Ah/kg 23.5 g/Ah | 3.6 Ah | 21.3 Ah/kg 46.9 g/Ah |
| 65 A (10 min) | 9.3 Ah | 59.9 Ah/kg 16.7 g/Ah | 4.3 Ah | 27.0 Ah/kg 37 g/Ah |
| 13.5 A (1.5 hr) | 15.0 Ah | 96.6 Ah/kg 10.3 g/Ah | 11.7 Ah | 70.1 Ah/kg 14.3 g/Ah |
| 4.1 A (6 hr) | 16.6 Ah | 107 Ah/kg 10.3 g/Ah | 14.2 Ah | 85.0 Ah/kg 11.8 g/Ah |
| 1.5 A (20 hr) | 17 Ah | 110 Ah/kg 9.1 g/Ah | 18 Ah | 108 Ah/kg 9.3 g/Ah |

Ah denotes ampere hours.

At low rate discharges, the gelled battery separator afforded similar electrical outputs to the control, standard absorbent glass mat (AGM) battery. However, as the rate increased, the gel battery outperformed the AGM by a considerable margin. At the highest discharge rate of 94 amps, the electrical output of the gelled battery was nearly twice that of a similar AGM battery. This behavior is in part explained by the better formation of the prototype battery.

It will be understood to those of ordinary skill in the art that the exemplary embodiments are described by way of illustration and not as limitations of the present invention. Those of ordinary skill will know or be able to ascertain, using no more than routine experimentation, many equivalents to the specific embodiments described herein. These and all other equivalents are intended to be encompassed by the following claims.

What is claimed is:

1. A method for constructing a gel-forming battery separator comprising:
    providing a porous support;
    embedding particles into pores of the porous support by applying the particles to a side of the porous support and applying a vacuum to an opposite sick of the porous support, thereby forming a composite, the particles having surfaces comprising a silanol group; and
    contacting the composite with an effective amount of liquid electrolyte; contact with the liquid electrolyte being capable of forming a gelled matrix comprising electrolyte within the porous support.

2. The method according to claim 1, wherein the particles are fumed silica particles.

3. The method according to claim 1, wherein the liquid electrolyte comprises sulfuric acid.

4. A method of forming a battery comprising:
    providing a container and at least one pair of electrodes;
    placing gel-forming battery separators between each of the at least one pair of electrodes, each separator comprising: a porous support having particles embedded therein, the particles having surfaces comprising a silanol group;
    adding liquid electrolyte to the container, the liquid electrolyte having a specific gravity below a predetermined value required to form a gelled matrix when in contact with the separators; and
    charging the electrodes to form the battery, the charging causing an increase in the specific gravity to the value required to form the gelled matrix.

5. A method according to claim 4, the particles being fumed silica, the liquid electrolyte being sulfuric acid, wherein, the value required to form the gelled matrix is about 1.28.

* * * * *